March 10, 1953   A. H. W. ATEN ET AL   2,631,100
PALATABLE PROTEIN PRODUCTS FROM WHEY
Filed Feb. 27, 1948
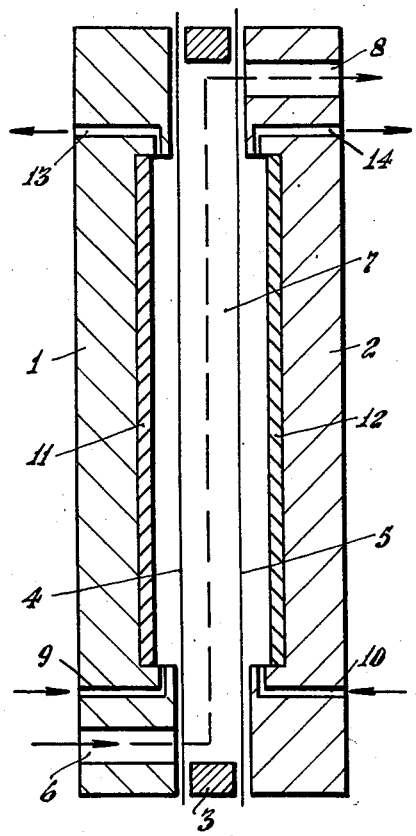
INVENTORS
ADRIAAN HENDRIK WILLEM ATEN,
SYBRANDUS GERHARDUS WIECHERS
BY
Pollard E Johnston
ATTORNEYS Patented Mar. 10, 1953

2,631,100

UNITED STATES PATENT OFFICE 2,631,100

PALATABLE PROTEIN PRODUCTS FROM WHEY

Adriaan Hendrik Willem Aten, Hilversum, and Sybrandus Gerhardus Wiechers, The Hague, Netherlands, assignors to de Nederlandsche Centrale Organisatie Voor Toegepast-Natuurwetenschappelijk Onderzoek, The Hague, Netherlands, a corporation of the Netherlands Application February 27, 1948, Serial No. 11,854
In the Netherlands March 3, 1947

13 Claims. (Cl. 99—57)

This invention relates to protein-containing food products suitable for human consumption products from whey, a by-product obtained in large quantities in the production of cheese, casein and the like, by the action of rennet, acids or other reagents.

The production of whey products in the form of powders and pastes by subjecting the same to a drying action through evaporation or spraying has been known and practiced for many years. These products however have not been suitable for human consumption because of their unpalatable taste and their unsatisfactory stability during storage. They are suitable as cattle feed and have to a considerable extent been used for this purpose.

An object of the present invention is to produce food products for human consumption from whey, having not only an acceptable taste but also good storage properties.

It has now been discovered that the unpalatable and poor storage properties of known whey products are caused by the presence of a substantial percentage of inorganic salts in the whey and in the dry products produced therefrom. The amount of salts in natural whey or whey produced without the addition of other salts may be as high as 8 or 9% based on the dry material. The amount of salts in whey products, however, is often increased due to the addition of calcium chloride or other salts in order to increase the curling tendency of the milk. When acid is employed for assisting the curdling, as for example in the production of casein, a whey powder is obtained having a greatly increased content of electrolyte since the added acids must be neutralized.

Broadly considered, the process of the present invention involves removing all or most of the salt content ionized or ionizable in the whey thereby reducing the ash content thereof by at least 80%. The resulting product has a good taste and good stability during storage. The reduction of the salt content is very effectively accomplished by subjecting the same to an electrodialysis treatment designed, adjusted and controlled in such manner as to complete the purification before deterioration of the proteins therein occurs.

Conventional dialysis procedures will not accomplish the desired results, for in such procedures the action is much too slow and the whey is subject to a high degree of deterioration.

The rapid electrodialysis of the present invention is accomplished through a number of innovational factors. The electrodialysis and prevention of deterioration of the proteins is facilitated primarily by maintaining the pH value of the reaction mass constant or nearly constant. Any change of the pH value during the electrodialysis tends to cause flocculation of the proteins or a clogging of the diaphragms or both. Preferably substantially neutral or a slightly acid condition is maintained in the whey. A pH value of 6 leads to excellent results. However, one can also use other pH values, even as low as 4 or 3 or as high as 9. When working at a high pH value the ash content may be reduced by 90% or more. With usual whey a pH value of about 6 has the advantage that flocculation of the proteins or clogging of the diaphragms does not occur in any substantial degree.

The pH of the whey during the treatment may be maintained constant in various ways as by means of suitably chosen compositions and flow velocity of the rinsing liquids in the electrode chambers, e. g. the cathode and/or anode chamber.

The electrodialysis process of the invention is most expeditiously conducted at a temperature of about 40° C. The treatment, however, can be carried out advantageously at slightly elevated temperatures below this level down to room temperatures. It is desirable to maintain the temperature as high as possible in view of the resistance of the liquid while at the same time avoiding temperatures which are sufficiently high to cause flocculation or denaturation of the proteins. At 40° C. the proteins do not flocculate and the resistance of the liquid is substantially lower than at room temperatures.

In accordance with an exemplary process of the invention, the whey, (preferably one that has been first thickened by evaporation) is introduced into an electrodialytic cell between diaphragms. The potential employed will vary, for it is a function of the cell, of the temperature, of the concentration of the whey and of the composition of the rinsing liquids in the electrode chambers. During the treatment, the pH value of the reaction mass is kept constant, preferably by a suitable choice of the composition of the rinsing liquids in the electrode chambers. Advantageously the rinsing liquid in the anode chamber is slightly acid, and in the cathode chamber slightly alkaline. Sometimes it has advantages to use as anode rinsing liquid dilute solutions of salts whether or not mixed with the corresponding acid.

The velocity of the rinsing liquid can be varied within wide limits. In general one must use a smaller velocity when the rinsing liquid in the cathode chamber is less alkaline or less acidic in the anode chamber. The desirable velocity is easily controllable by measuring the pH of the whey and speeding up the velocity of the anodic rinsing liquid and/or decreasing the velocity of the cathodic rinsing liquid, when the pH of the whey tends to decrease. Regulation can also be effected by adding less acid to the anodic liquid or more alkali to the cathodic liquid. Eventually this method of keeping constant the pH of the whey may be combined with other methods known in themselves if desired, the electrodialysis may be carried out continuously.

After the dialysis treatment has been applied for a period of a few hours, the whey or thickened whey will be practically depleted of electrolyte or will at least be free of objectionable amounts of salts. After its separation from the cell, the protein-containing product obtained may be concentrated if desired by spraying to produce dry or substantially dry products.

With reference to the accompanying drawing an electrodialysis cell in vertical section is illustrated, in which cell the process of the present invention may be carried out. The cell is composed of oppositely disposed walls 1 and 2 which are held together by suitable means (not shown) against a frame 3. Membranes 4 and 5 are also supported by the walls and said frame member. The liquid to be dialyzed is introduced into the cell through the inlet 6, passes upwardly through the chamber 7 and out of the cell through the outlet 8, which course is indicated by arrows and a broken line. The inlets 9 and 10 are provided for the introduction of the anode and cathode rinsing liquids which liquids pass upwardly in contact with the membranes 4 and 5 and in contact with the anode 11 and cathode 12 respectively and thence out through the outlets 13 and 14.

*Example 1*

A whey product having a content of 6.4% dry material, 0.7% ash and a pH value of 6.7 is subjected to evaporation for removal of water until the solids content of the material being treated is 42%. The mass is then allowed to cool and the lactose which crystallizes is then removed by centrifuging or filtering. The thickened whey thus obtained has a lactose content of 26%, a chloride content of 1.0% and an ash content of 4.6%. The pH value of the solution is adjusted to a value of about 6, if it is not already at such acidity. The mass is then subjected to electrodialysis at a temperature maintained at 40° C. in a cell wherein the rinsing liquid in the electrode chamber at the anode is composed of 0.01 n-potassium sulphate and 0.007 n-sulphuric acid and wherein the rinsing liquid at the cathode chamber is composed of 0.01 n-sodium hydroxide.

The rinsing velocity in the electrode chambers, in which 125 liters of the whey product are dialyzed, is 1200 liters per hour for each of the rinsing liquids. The consumption of current is 125 kwh. The potential employed is about 30 to 40 volts per cell. During the process the pH value is maintained constant at about 6 by the addition of a dilute solution of sodium hydroxide. During the treatment the mass is maintained in rapid motion by means of a suitable agitator. After about a period of 1½ hours, the electrodialysis is complete. The mass obtained will be found to contain 24.4% lactose and only 0.6% ash, and it is completely free of chloride. An analysis of the ash remaining in the product reveals that it is composed of calcium phosphate. The product may be further treated in any conventional manner to produce dry products in a marketable form.

*Example 2*

Whey paste having a solids content amounting to 65% is mixed with water in the ratio of 2 to 1 and the pH value thereof is adjusted to 6. The resulting slurry is then subjected to electrodialysis and as a result after a short period, part of the lactose deposits in a very pure form. This deposition does not take place from untreated diluted whey paste. The partially dialyzed product is then further dialyzed in accordance with the procedure of Example 1. Thereby a product is obtained containing substantially no free electrolyte and through evaporation a protein-containing, palatable, stable product is obtained having a solids content of 65%.

*Example 3*

A whey powder having a protein to salt ratio of 16 to 14 is mixed with warm water in a quantity providing a slurry having about 45% solid material. The slurry is then electrodialyzed in an apparatus of suitable construction with a current density of about 90 m.amp./cm$^2$. As rinsing liquids are used: in the anode compartment a mixture of 0.01 normal phosphoric acid and 0.02 n-monopotassium phosphate, and in the cathodic chamber a solution of 0.01 n-potassium hydroxide. The amounts of the three above mentioned rinsing liquids flowing through the said electrode chambers are chosen so that the pH value of the whey in the electrodialysis chamber which is about 5.7 is adjusted to about 7 in the first 20 minutes of the electrodialysis and remains at that value during the rest of the time. After about 1½ to 2 hours the ratio of protein to salt will be found reduced to 16 to 2.5.

*Example 4*

A whey paste having a protein to salt ratio of 16 to 14 is mixed with water and after it is adjusted to a pH value of 6 it is subjected to electrodialysis until the protein to salt ratio is reduced to 16 to 1.3 which result is obtained after a period of about 2 hours in the cell. During the operation particular care is taken to maintain the pH constant during the last part of the electrodialysis, for the buffering action of the product is very slow and if the pH value is permitted to decrease excessively, the diaphragms of the cell will become clogged due to coagulation of the proteins.

*Example 5*

Concentrated whey having a content of 44% solids is subjected to electrodialysis after the pH has been adjusted to a value of 8. In the electrode chamber at the anode, the rinsing liquid employed is composed of 0.02 n-potassium sulphate and in the electrode chamber at the cathode a 0.02 n-sodium hydroxide solution is used. The cell is operated at a current density of 0.08 amp./cm$^2$ of the surface of the diaphragm and at a potential of 30 to 40 volts per cell. After about 2½ hours the ash content of the product is reduced to 0.3%. In effecting the dialysis of 100 liters of concentrated whey, a rinsing velocity of 1500 liters per hour is used at the start of the dialysis, and later this velocity is reduced to 900 liters per hour. The product thus obtained is dried in a suitable spraying apparatus at a temperature of 65° C., thereby obtaining a powder having an ash content of about 1.1%.

*Example 6*

Concentrated whey left after the separation of casein by the use of hydrochloric acid, containing 46% dried materials and 14% ash calculated on the dry basis, is subjected to electrodialysis as in the foregoing examples. When conditions similar to those employed in Example 5 are used, the ash content of the product obtained is lowered to 0.5% after about 115 minutes treatment, the said product being completely free of chlorine. Thereafter the product may be evaporated to a paste having a content of dry material of about 65%.

The products obtained by the process of the present invention have a very acceptable taste and without further treatment are suitable for human consumption. They are also stable and therefore may be stored for future consumption without noticeable deterioration. The said products possess a high albumen content and a high percentage of lactose which imparts to them a sweet taste. The particular albumen of the product constitutes a protein of substantial biological value rendering these products particularly desirable as constituents in food. The products may be most satisfactorily employed in the production of bakery goods, in the production of prepared baby foods and in the production of pudding powders.

It should be understood that the present invention is not limited to the detailed procedures or conditions of treatment herein described but that it extends to all equivalents which will occur to those skilled in the art upon consideration of the breadth of the claims appended hereto.

We claim:

1. The process of treating whey wherein inorganic salts are removed without causing denaturation of the protein content thereof, which comprises subjecting the whey, by application of a direct current to electrodialysis, maintaining the whey at a constant pH value and continuing the electrodialysis until salts therein have been removed in an amount reducing the ash content by at least about 80%.

2. The process of altering whey for the purpose of rendering it suitable for human consumption which comprises, subjecting the whey, by application of a direct current to electrodialysis at a rapid rate which avoids deterioration of the proteins therein, maintaining the whey during the electrodialysis at a slightly elevated temperature not above about 40° C. and at a substantially constant pH continuing the electrodialysis treatment until the salts separated therefrom result in reduction of the ash content by at least about 80% and a whey product is obtained containing its original protein in an undenatured condition.

3. A process for the production of protein-containing food products from whey, suitable for human consumption which comprises, subjecting whey, by application of a direct current, to an electrodialysis, conducting the said dialysis at a pH maintained constant at a value of about 6 until the ash content of the whey is reduced by at least 80%, thereby producing a whey product containing its original protein in an undenatured condition.

4. A process for the production of protein-containing food products from whey, suitable for human consumption which comprises, subjecting whey, by application of a direct current, to an electrodialysis maintaining the whey during the hydrolysis at a constant pH value by adding as needed a pH adjusting agent and continuing the dialyzing treatment until the ash content of the whey product is reduced by at least 80%, thereby producing a whey product containing its original protein in an undenatured condition.

5. A process for the production of protein-containing food products from whey, suitable for human consumption which comprises, subjecting whey, by application of a direct current, to an electrodialysis, maintaining the whey at a constant pH value of about 6, continuing the electrodialysis until the ash content of the whey is reduced by at least 80%, the said treatment being carried out at a slightly elevated temperature.

6. A process for the production of protein-containing food products from whey, suitable for human consumption which comprises, subjecting whey, by application of a direct current, to an electrodialysis, maintaining the whey at a constant pH value, continuing the electrodialysis until the ash content of the whey is reduced by at least 80%, the said treatment being carried out at a temperature of about 40° C.

7. A process for the production of protein-containing food products from whey, suitable for human consumption which comprises, subjecting whey, by application of a direct current, to an electrodialysis, maintaining the whey at a constant pH value by continually adding an appropriate pH value adjusting agent, maintaining the mass at a slightly elevated temperature, and discontinuing the electrodialysis after the ash content of the whey is reduced by at least 80%.

8. In an electrodialyzer having a cathode cell with a cathode, an electrodialysis cell separated from said cathode cell by a membrane, an anode cell with an anode separated from said electrodialysis cell by a second membrane, a process for producing a palatable food product composed of whey solids suitable for consumption in bakery products, puddings and the like which comprises, subjecting whey by application of a direct current to electrodialysis, maintaining the whey at a constant pH value, continuing the electrodialysis until the ash content of the whey is reduced by at least 80%, and during the electrodialysis rinsing the cathode cell by a dilute aqueous alkaline solution and the anode cell by a dilute aqueous acidic solution.

9. The process as claimed in claim 8 wherein the anode rinsing liquid is composed of a dilute aqueous solution of an alkali metal sulfate and sulfuric acid and the cathode rinsing liquid is a dilute aqueous alkaline solution.

10. In an electrodialyzer having a cathode cell with a cathode, an electrodialysis cell separated from said cathode cell by a membrane, an anode cell with an anode separated from said electrodialysis cell by a second membrane, a process for producing a palatable food product composed of whey solids suitable for consumption in bakery products, puddings and the like which comprises, subjecting whey by action of a direct current to electrodialysis, maintaining the whey during electrodialysis at a constant pH value of about 6, continuing the electrodialysis until the ash content of the whey is reduced by at least 80%, and during said electrodialysis rinsing the anode cell with a dilute aqueous solution of an alkali metal sulfate and sulfuric acid and the cathode cell with a dilute aqueous alkaline solution.

11. In an electrodialyzer having a cathode cell with a cathode, an electrodialysis cell separated from said cathode cell by a membrane, an anode cell with an anode separated from said electrodialysis cell by a second membrane, a process for producing a palatable food product composed of whey solids suitable for consumption in bakery products, puddings and the like which comprises, subjecting whey by application of a direct current to electrodialysis, maintaining the whey during the electrodialysis at a substantially constant pH value by periodically adding as needed a pH adjusting agent and by adjusting the velocity flow of rinsing liquids in the electrode chambers, continuing the dialyzing treatment until the ash content of the whey product is reduced by at least 80%, and during the electrodialysis rinsing the cathode cell with a dilute aqueous alkaline solution and the anode cell with a dilute aqueous acidic solution.

12. In an electrodialyzer having a cathode cell with a cathode, an electrodialysis cell separated from said cathode cell by a membrane, an anode cell with an anode separated from said electrodialysis cell by a second membrane, a process for producing a palatable food product composed of whey solids suitable for consumption in bakery products, puddings and the like which comprises, subjecting whey by application of a direct current to electrodialysis, maintaining the whey at a constant pH value of about 6 by adjusting the velocity flow of rinsing liquids in the electrode chambers, maintaining the temperature during the treatment at an elevated temperature not above about 40° C., continuing the electrodialysis until the ash content of the whey is reduced by at least 80% and rinsing the cathode cell with a dilute aqueous alkaline solution and the anode cell with a dilute aqueous acidic solution.

13. In an electrodialyzer having a cathode cell with a cathode, an electrodialysis cell separated from said cathode cell by a membrane, an anode cell with an anode separated from said electrodialysis cell by a second membrane, a process for producing a palatable food product composed of whey solids suitable for consumption in bakery products, puddings and the like which comprises, subjecting whey by application of a direct current to an electrodialysis, maintaining the whey at a constant pH value by continuously adding as needed a pH adjustment agent, maintaining the mass during the reaction at a slightly elevated temperature, continuing the dialysis until the ash content of the whey is reduced by at least 80%, rinsing the anode cell with a dilute aqueous solution of an alkali metal sulfate and sulfuric acid and the cathode cell with a dilute aqueous alkaline solution.

ADRIAAN HENDRIK WILLEM ATEN.
SYBRANDUS GERHARDUS WIECHERS.

REFERENCES CITED

The following references are of record in the file of this patent:

UNITED STATES PATENTS

| Number | Name | Date |
| --- | --- | --- |
| 1,022,523 | Whitney | Apr. 9, 1912 |
| 1,503,892 | Grindrod | Aug. 5, 1924 |
| 1,511,808 | Grindrod | Oct. 14, 1924 |
| 1,714,597 | Grindrod | May 28, 1929 |
| 2,093,770 | Billiter | Sept. 21, 1937 |
| 2,437,080 | Daniel | Mar. 2, 1948 |
| 2,465,906 | Meade et al. | Mar. 29, 1949 |

FOREIGN PATENTS

| Number | Country | Date |
| --- | --- | --- |
| 248,998 | Great Britain | Mar. 18, 1926 |
| 406,407 | Great Britain | Mar. 1, 1934 |